(12) United States Patent
Oteri et al.

(10) Patent No.: US 12,063,664 B2
(45) Date of Patent: Aug. 13, 2024

(54) MULTIPLEXING OF UPLINK TRANSMISSIONS

(71) Applicant: Apple Inc., Cupertino, CA (US)

(72) Inventors: Oghenekome Oteri, San Diego, CA (US); Chunhai Yao, Beijing (CN); Chunxuan Ye, San Diego, CA (US); Dawei Zhang, Saratoga, CA (US); Hong He, San Jose, CA (US); Huaning Niu, San Jose, CA (US); Seyed Ali Akbar Fakoorian, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 17/438,227

(22) PCT Filed: Jul. 22, 2021

(86) PCT No.: PCT/CN2021/107750
§ 371 (c)(1),
(2) Date: Sep. 10, 2021

(87) PCT Pub. No.: WO2023/000239
PCT Pub. Date: Jan. 26, 2023

(65) Prior Publication Data
US 2023/0354360 A1    Nov. 2, 2023

(51) Int. Cl.
*H04W 72/232*     (2023.01)
*H04L 1/1812*     (2023.01)
*H04W 72/12*      (2023.01)

(52) U.S. Cl.
CPC ......... *H04W 72/232* (2023.01); *H04L 1/1812* (2013.01); *H04W 72/12* (2013.01)

(58) Field of Classification Search
None
See application file for complete search history.

(56) References Cited

U.S. PATENT DOCUMENTS

2019/0254056 A1\* 8/2019 Salah ................ H04W 72/1263
2020/0328849 A1 10/2020 Noh et al.
(Continued)

FOREIGN PATENT DOCUMENTS

| EP | 3823369 A1 | 5/2021 |
|---|---|---|
| WO | 2020222624 A1 | 11/2020 |
| WO | 2021092399 A1 | 5/2021 |

OTHER PUBLICATIONS

Partial Supplementary European Search Report for EP Application No. 21899296.4; Jun. 13, 2023.
(Continued)

*Primary Examiner* — Alex Skripnikov
(74) *Attorney, Agent, or Firm* — Kowert, Hood, Munyon, Rankin & Goetzel, P.C.

(57) ABSTRACT

This disclosure relates to techniques for performing wireless communications including multiplexing of uplink control information communications with other communications between a user equipment device (UE) and a base station. Techniques for generating control information and performing multiplexing are disclosed. The UE may select resources for multiplexing and determine how/if to generate response data for various downlink transmissions are disclosed.

20 Claims, 9 Drawing Sheets

(56) References Cited

U.S. PATENT DOCUMENTS

| | | | | |
|---|---|---|---|---|
| 2020/0351837 A1* | 11/2020 | Hwang | | H04L 1/1812 |
| 2021/0067274 A1 | 3/2021 | Takeda et al. | | |
| 2022/0264402 A1* | 8/2022 | Nemeth | | H04W 36/06 |
| 2022/0271870 A1* | 8/2022 | Wu | | H04L 1/1614 |
| 2023/0063957 A1* | 3/2023 | Yeo | | H04W 72/23 |
| 2023/0199765 A1* | 6/2023 | Babaei | | H04W 72/52 |
| | | | | 370/329 |
| 2023/0209530 A1* | 6/2023 | Rastegardoost | | H04L 1/1854 |
| | | | | 370/329 |
| 2023/0318686 A1* | 10/2023 | Kwak | | H04B 7/088 |
| | | | | 455/101 |
| 2023/0371039 A1* | 11/2023 | Tsai | | H04W 72/232 |
| 2023/0403717 A1* | 12/2023 | Rastegardoost | | H04W 72/232 |
| 2024/0007149 A1* | 1/2024 | Yuan | | H04B 7/0404 |
| 2024/0040587 A1* | 2/2024 | Rastegardoost | | H04W 72/232 |

OTHER PUBLICATIONS

ZTE "On scheduling/HARQ processing timeline for URLLD"; 3GPP TSG RAN WG1 #96 R1-1901770; Feb. 25, 2019.

ZTE "DL/UL scheduling and HARQ for URLLC"; 3GPP TSG RAN WG1 Meeting #95 R1-1812387; Nov. 12, 2018.

NTT Docomo et al. "Maintenance for physical uplink control channel"; 3GPP TSG RAN WG1 Meeting #95 R1-1813302; Nov. 12, 2018.

Qualcomm Inc. "Summary of #4 of Enhancements to Scheduling/HARQ"; 3GPP TAG-RAN WG1 Meeting #98b R1-1911708; Oct. 14, 2019.

International Search Report and Written Opinion for PCT/CN2021/107750; 9 pages; Apr. 26, 2022.

CATT "Remaining issues on CA and BWP operation"; 3GPP TSG RAN WG1 Meeting #94bis R1-1810523; Chengdu, China; 6 pages; Oct. 12, 2018.

3GPP "Technical Specification Group Radio Access Network; NR; Physical layer procedures for control"; 3GPP TS 38.213 V2.0.0; 56 pages; Dec. 30, 2017.

Samsung "Introduction of MIMO enhancements"; 3GPP TSG-RAN WG1 Meeting #99 R1-1913202; 39 pages; Nov. 22, 2019.

* cited by examiner

MULTIPLEXING OF UPLINK TRANSMISSIONS

PRIORITY CLAIM INFORMATION

This application is a U.S. National Stage application of International Application No. PCT/CN2021/107750, filed Jul. 22, 2021, titled "Multiplexing of Uplink Transmissions", which is hereby incorporated by reference in its entirety.

TECHNICAL FIELD

The present application relates to wireless communication, including to multiplexing of uplink transmissions.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be multiplexing of uplink control and/or data communications. Improvements in the field are desired.

SUMMARY

Embodiments are presented herein of, inter alia, systems, apparatuses, and methods for performing multiplexing of uplink communications in a wireless communication system, e.g., New Radio (NR), e.g., in frequencies above 52.6 GHz.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for scheduling multiple communications, e.g., multiple physical uplink share channel (PUSCH) and/or physical downlink share channel (PDSCH) transmissions (e.g., multi-PxSCH). A multi-PUSCH transmission may be multiplexed with uplink control information (UCI), e.g., on a physical uplink control channel (PUCCH). Similarly, a multi-PDSCH transmission may be multiplexed with downlink control information (DCI), e.g., on a physical downlink control channel (PDCCH). Accordingly, the techniques described herein include techniques for a UE and base station to perform such multiplexing, e.g., particularly of UCI and uplink data in a multi-PUSCH overlapping with PUCCH.

For example, a UE may establish communication with a base station. The base station may provide control and/or configuration information to the UE. The base station may transmit control information to the UE to schedule uplink and/or DL transmissions, e.g., including a multi-PUSCH transmission. The UE may exchange communications with the base station as scheduled by the control information. The UE may generate uplink control information. The uplink control information may include response data for one or more downlink transmissions. For example, the UCI may include acknowledgement and/or negative acknowledgement of a PDSCH transmission(s). The UE may select resources to multiplex the uplink control information with uplink data transmissions. To generate the response data and/or to select the resources, the UE may consider factors such as scheduling, indications in control information, processing delay, and/or relative timing of various transmissions. The UE may transmit the uplink control information.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™) portable gaming devices (e.g., Nintendo DS™, PlayStation Portable™, Gameboy Advance™ iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
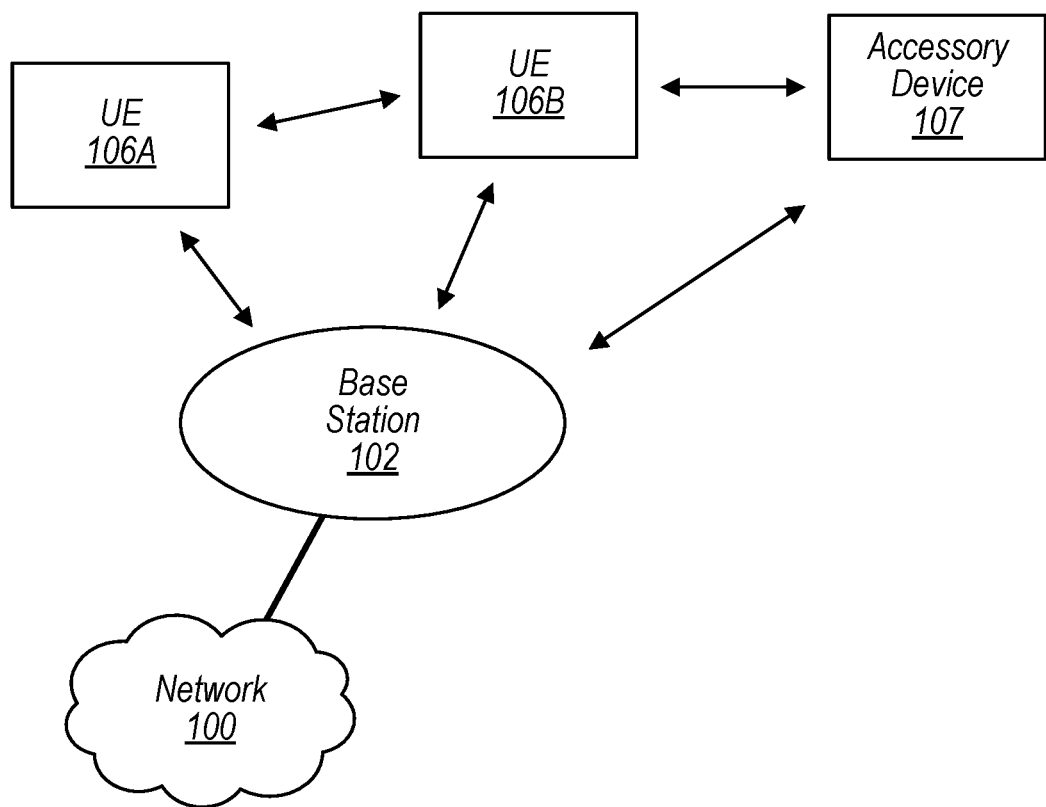
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
RRC: Radio Resource Control
MAC: Media Access Control
CE: Control Element
Tx: Transmission (or transmit)
Rx: Reception (or receive)
RS: Reference Signal
CSI: Channel State Information
PDCP: packet data convergence protocol
RLC: radio link control

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a nonvolatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")— any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/ receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
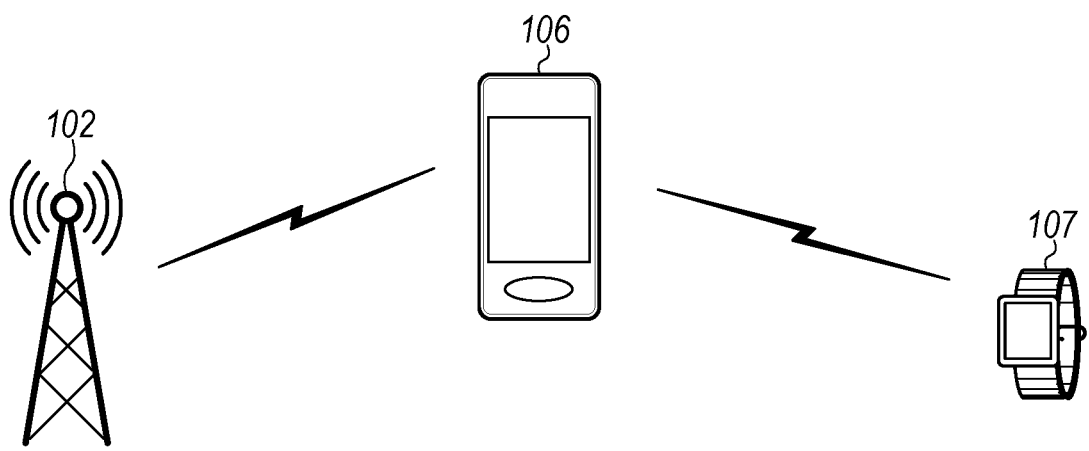
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
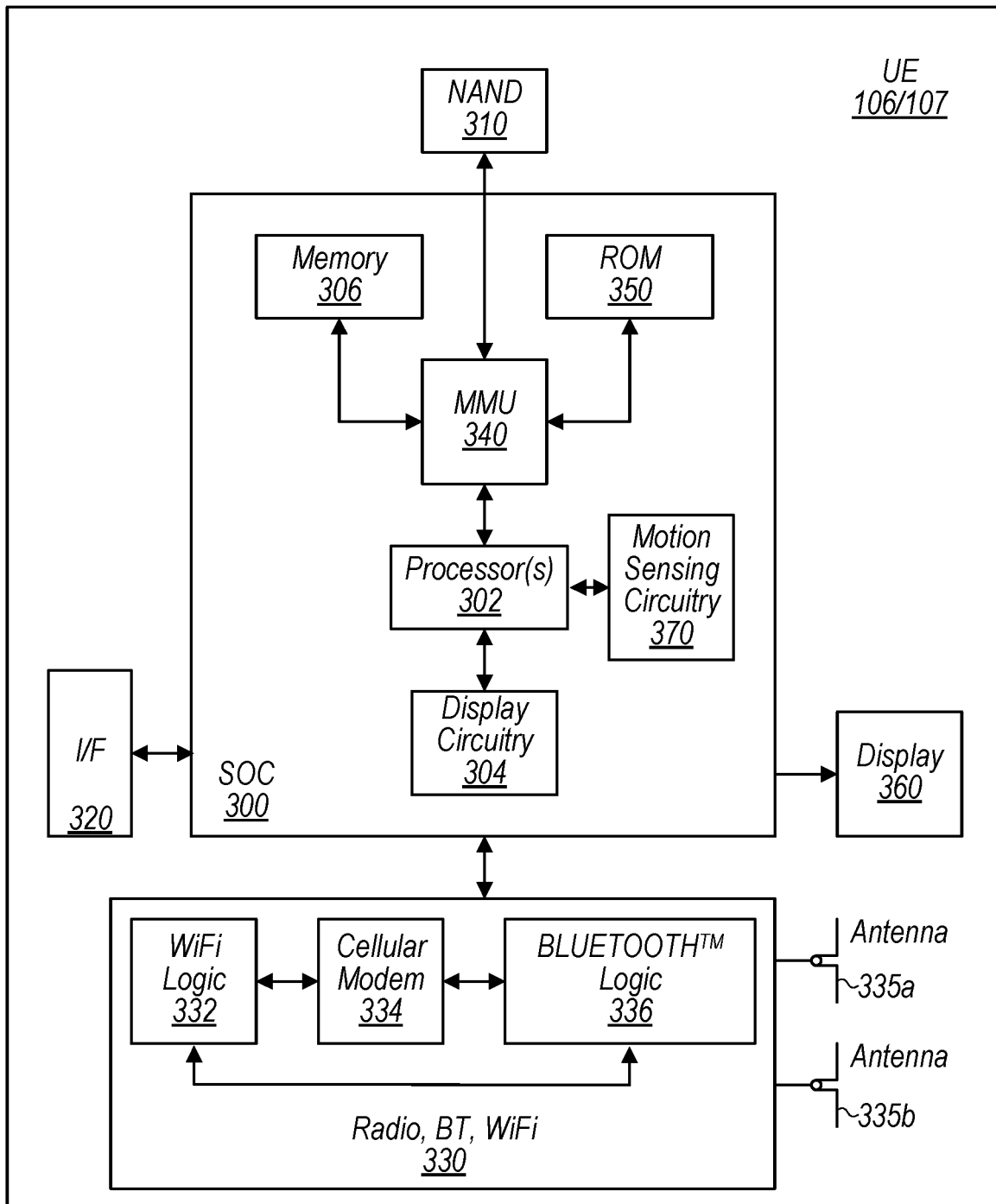
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
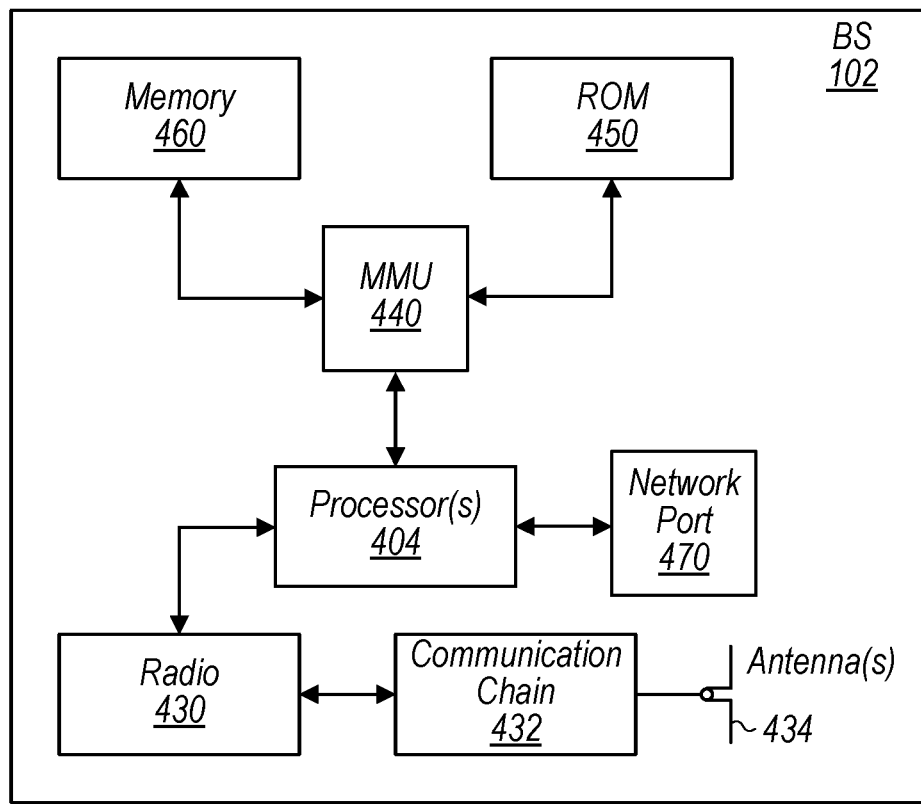
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Figure 5:
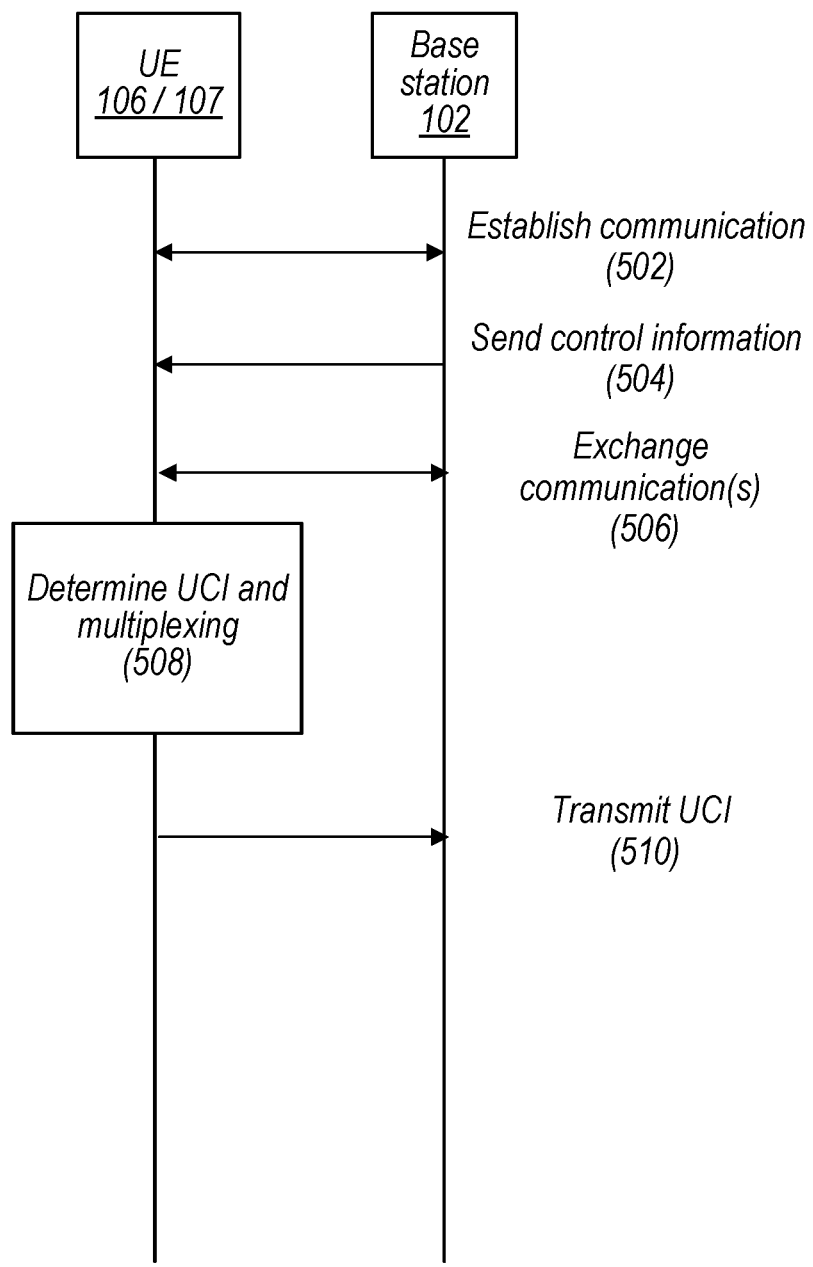
FIG. 5 is a communication flow diagram illustrating an example method for multiplexing uplink communications, according to some embodiments.

FIG. 5— Multiplexing

Scheduling of multiple communications using a single scheduling message may allow for reduced overhead, e.g., relative to individual scheduling of the communications. Accordingly, wireless communications such as new radio (NR) and NR-unlicensed (NR-U) may support mechanisms for scheduling multiple uplink (UL) and/or downlink (DL) communications (e.g., to occur over a period of time) using a single scheduling message. For example, e.g., for a single UE, a base station may schedule multiple physical UL shared channel (PUSCH) and/or physical DL shared channel (PDSCH) transmissions (e.g., multi-PxSCH may refer to multiple UL and/or DL communications on the respective shared channels) together. Scheduling of multiple communications using a single scheduling message may also allow a base station to schedule over multiple slots. For example, a PDCCH may be monitored (e.g., by the UE)/transmitted (e.g., by the base station) once every multiple slots (e.g., every third slot, etc.). In some embodiments, such periodic PDCCH monitoring may reduce the PDCCH monitoring complexity that may arise due to the reduction of the slot/symbol size caused by the increase in the subcarrier spacing to 480 kHz and 960 kHz.

It will be appreciated that monitoring PDCCH every multiple slots may be different than semi-persistent scheduling (SPS). In SPS, a DCI may activate the SPS transmission and then the UE expects a PDSCH every X slots. There may be no need for a new DCI until the SPS transmission is stopped by a second DCI. SPS may apply to PDSCH, while multi-slot monitoring may apply to PDCCH. In mutli-slot monitoring, the UE may expect a DCI once every X slots. In this case, the UE may perform blind decoding every X slots. The PDCCH monitoring budgets (BD/CCE budgets) may be defined over the new multiple slots. This may be different from prior standards where they were defined on a slot or sub-slot granularity. This may increase a timer (e.g., the SCS t 960) which may imply the slot duration drops by a factor of 8 compared with legacy. To prevent the UE from having to perform a blind decode 8 times as fast, the 8 slots may be grouped into one resulting in one PDCCH over the entire 8 slots. According to multiple PxSCH transmission, the one (e.g., grouped) PDCCH may schedule multiple PDSCHs or PUSCHs.

A downlink control information (DCI) message may be an example of a scheduling message that may be used to schedule multiple communications, e.g., PDSCH, PUSCH, PDCCH, and/or PUCCH. Said another way, scheduling for multiple communications may be provided in DCI signaling.

In instances where a single scheduling message schedules multiple uplink data transmissions (e.g., multi-PUSCH), there may be various possibilities for multiplexing uplink control information (UCI) (e.g., on a physical uplink control channel (PUCCH)). For example, such UCI may be or include response data, e.g., hybrid automatic repeat request (HARQ) acknowledgement (ACK) or negative acknowledgement (NACK). The UE may generate response data to indicate whether one or more downlink data transmissions (e.g., including downlink transmissions of control information) are or are not successfully received. The downlink transmission(s) on which the response data is based may be scheduled by a single DCI or by multiple DCIs. The UCI may also or alternatively include scheduling request (SR) and/or channel state information (CSI), among various possibilities.

It will be appreciated that a multi-PUSCH may include different PUSCH transmissions in different slots, according to some embodiments.

FIG. 5 is a communication flow diagram illustrating an example method for multiplexing UCI with one or more of multiple uplink data transmissions, according to some embodiments. In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network, and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 332, 334, 336, 430, or 432, processors associated with various core network elements, etc., among various possibilities) may cause a UE, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. As shown, the method may operate as follows.

The UE and the base station may establish communication (502), according to some embodiments. The UE and the base station may communicate using one or more radio access technologies (RATs), e.g., including NR. The UE and the base station may communicate using any frequency resources, e.g., including NR operations above 52.6 GHz, among various possibilities. The UE and the base station may communicate using one or more frequency carriers, e.g., including licensed and/or unlicensed carriers. The base station may provide one or more cell and/or cell groups and the communication between the UE and the base station may use one or more cell and/or cell group.

The base station may exchange configuration information with the UE. For example, the base station may use radio resource control (RRC) and/or other higher layer signaling to negotiate parameters and/or configure the UE. Among various possibilities, the configuration information may include various parameters relevant to multiplexing UCI. The UE may provide capability information, e.g., relating to its multiplexing ability with respect to UCI and/or other capabilities. For example, the UE may provide information about relevant processing delay time(s).

For example, the configuration information may include an indication of whether the UE may be expected to have more than one PUCCH overlapping a PUSCH, e.g., in a multi-PUSCH scheduled by a single DCI. Further, a particular or maximum number of PUCCHs that may overlap PUSCH for a multi-PUSCH may be established. Still further, one or more configurations for selecting particular PUSCHs for multiplexing PUCCH may be included, e.g., indicated by the BS to the UE. For example, the configuration information may indicate that the last one or more PUSCHs may be used for multiplexing, or that a particular pattern of PUSCHs (e.g., every third PUCCH, etc.) may be used for multiplexing.

As another example, the configuration may include one or more timelines for multiplexing PUCCH with PUSCH, e.g., in a multi-PUSCH. For example, the UE and base station may negotiate one or more processing delay value(s) for particular circumstances. A first processing delay may describe a minimum amount of time for the UE to receive a downlink data transmission (e.g., PDSCH), generate response data, perform multiplexing of the response data with other uplink data and/or UCI, and transmit the response data (e.g., multiplexed on PUSCH). Such a processing delay may be expressed as a number of symbols following the downlink data transmission, among various possibilities.

Another processing delay may describe a time period for which the UE may provide a negative acknowledgement, e.g., for any downlink data transmission scheduled (e.g., whether successfully received or not) during the time period. The length of this period of time may be the same or different as the first processing delay described above. However, it may be applied at a different time and/or may relate to different behavior.

Similarly, a processing delay associated with switching bandwidth parts (BWP) may be configured. Such a processing delay may describe the minimum amount of time (e.g., in symbols, etc.) for the UE to receive DCI indicating a change in BWP, prepare an uplink transmission (e.g., PUCCH and/or PUSCH), and transmit on the new BWP. A processing delay related to BWP switching may be referred to as N2, among various possibilities.

Further, the configuration information may include identification of what transmission(s) a processing delay is measured to, according to some embodiments. For example, a processing delay may refer to a period of time before a first uplink transmission of any type. Alternatively, a processing delay may refer to a period of time before a first uplink transmission that includes UCI (e.g., multiplexed with other UL data). As another possibility, a processing delay may apply iteratively to respective periods of time before respective uplink transmissions. For example, a first processing delay may apply between a DL transmission and a UL transmission that will include response data for the DL transmission; a second processing delay may apply between a second DL transmission and a second UL transmission that will include response data for the second DL transmission before a second uplink transmission that will include response data for the second DL transmission, etc. The second processing delay may have the same length as the first processing delay. In some embodiments, the lengths may be different. In some embodiments, identification of what transmission(s) a processing delay is measured to may be determined by standardization.

The base station may transmit control information to the UE (504), according to some embodiments. The control information may schedule UL and/or DL communications, e.g., of control information and/or data. The control information may include one or more DCI messages, e.g., of any of various DCI formats. For example, one DCI may schedule one or more DL transmissions e.g., including data transfers (e.g., PDSCH transmissions) and/or control information (e.g., PDCCH transmissions). Another DCI may schedule one or more uplink data transfers (e.g., multi-PUSCH). One or more PUSCH of the multi-PUSCH may overlap with PUCCH. The PUSCH that overlaps with PUCCH may be a candidate for multiplexing UCI (e.g., including SR, CSI, and/or HARQ response data, etc.). Any number of DCI messages scheduling UL and DL transmissions may be transmitted in any order. In some embodiments, a single DCI message may schedule both UL and DL transmissions, e.g., multi-PxSCH).

In some embodiments, the control information may include semi-persistent scheduling (SPS). For example, the control information may include an SPS grant for PDSCH, e.g., scheduling periodic downlink transmissions. SPS may be scheduled by DCI.

In some embodiments, the base station may include indications in the control information for how/if the UE should multiplex UCI (e.g., response data) with other UL transmissions. For example, the base station may include one or more indications in the DCI(s) such as PUCCH resource index (PRI) and/or UL-total DL assignment index (UL-TDAI), etc. that may be useable for the to determine multiplexing.

The UE and the base station may exchange some or all of the communications scheduled by the control information (506), according to some embodiments. For example, the UE may receive one or more DL transmissions (e.g., data/PDSCH and/or control information/PDCCH) from the base station. In some cases, some or all scheduled DL transmissions may not be received successfully by the UE.

The UE may determine UCI and multiplexing for the UCI (508), according to some embodiments. For example, the UE may determine which DL transmissions to positively acknowledge and/or which to negatively acknowledge. In other words, the UE may determine HARQ response data for DL transmissions.

The response data may be determined based on whether the DL data was received and/or based on scheduling information. For example, in some embodiments, the UE may determine some or all of the response data based on when DCI scheduling the DL transmission was received (e.g., relative to other events, e.g., DCI scheduling a UL transmission opportunity that the UE may use to multiplex the response data). As another example, the UE may determine some or all of the response data based on a scheduled time for the DL transmissions (e.g., relative to other events, e.g., a UL transmission opportunity that the UE may use to multiplex the response data or a first UL transmission of a multi-PUSCH).

The UE may determine resources to use for transmitting the response data. For example, the UE may select one or more PUSCH overlapped with PUCCH for multiplexing the response data. The UE may select the PUSCH(s) to use for multiplexing (e.g., from multiple overlapped PUSCHs) based on the control information and/or based on other factors, e.g., such as timing of the PUSCH(s). For example, the UE may consider indications in the DCI(s) such as PUCCH resource index (PRI) and/or UL-total DL assignment index (UL-TDAI), etc. As another example, the UE may consider timing of the PUSCH(s) relative to other events, such as timing of related DL transmissions, timing of DCI, and/or timing/position of the PUSCH(s) relative to other PUSCHs of a multi-PUSCH.

The base station may similarly determine (e.g., predict) what resources the UE may use, according to some embodiments. For example, the base station may consider indications included in the DCI, scheduling information, relative timing, etc. In other words, the base station may determine when (e.g., on what resources) to expect the UCI and how to interpret any response data received in various resources. For example, the base station may determine that response data received in a first resource may correspond to a first DL transmission and that response data received in a second resource may correspond to a second DL transmission. Said another way, the base station may determine which PUSCH of a multi-PUSCH may include multiplexed UCI. In some embodiments, standards and/or configuration may be sufficiently specific that it may be unambiguous what resources the UE may use. In some embodiments, the specification and/or configuration may allow for multiple possibilities. Thus, the base station may determine a plurality of possible resources that the UE may use to provide the UCI and may perform blind decoding of the possible resources.

The UE may multiplex the UCI and transmit the UCI on the determined resource(s) (510), according to some embodiments. The base station may receive and decode the UCI. The base station may retransmit any DL data for which the UCI indicates that the DL data was not received and/or any DL data for which no response data is included.

As noted above, elements of FIG. 5 may occur in various orders and/or be overlapping. For example, it will be appreciated that 506, 508, and 510 may occur in any order and/or be overlapping. For example, communications (e.g., of 506) may occur before and/or after the response data is generated (e.g., in 508) and/or transmitted (e.g., in 510).

FIGS. 6-9—Number and Signaling

In relation to multiplexing UCI with a multi-PUSCH, various numbers of UCI transmissions (e.g., PUCCHs) may be multiplexed. Similarly, various numbers of UL-TDAI fields may be defined in a single DCI for multiple PUSCHs.

Figure 6:
FIGS. 6-16 illustrate aspects of multiplexing of uplink communications, according to some embodiments.

FIG. 6 illustrates a timeline in which no more than one PUCCH may overlap PUSCH within a multi-PUSCH, according to some embodiments. In other words, at most one PUCCH transmission may overlap with at most one PUSCH of the multi-PUSCH.

As shown, a first DCI (e.g., format 1_Y) may schedule a downlink transmission (e.g., PDSCH 1). The first DCI may include an indication of the number of downlink transmissions, e.g., a counter downlink assignment index (CDAI). The CDAI may equal 1, e.g., corresponding to PDSCH 1. Y may be an integer describing different DCI formats, e.g., as adopted in standards, (e.g., 0-2, or possibly greater than 2 as additional DCI formats may be adopted).

The base station may transmit and the UE may (or may not) receive the downlink data (e.g., PDSCH 1).

A second DCI (e.g., format 0_Z) may schedule a series of uplink transmissions (e.g., multi-PUSCH, e.g., PUSCH 1-4 in the example). A single UL-TDAI bit field may be included, e.g., set to 1. The UL-TDAI may indicate that there is one PDSCH previously transmitted, e.g., and for which response data (e.g., HARQ ACK/NACK) has not been received by the base station. Z may be an integer describing different DCI formats, e.g., as adopted in standards, (e.g., 0-2, or possibly greater than 2 as additional DCI formats may be adopted). In various examples Y and Z may be the same or they may be different. In other words, any applicable DCI formats may be used for the first or second DCI, e.g., as desired.

The UE may generate response data, e.g., based on whether the downlink data was successfully received.

The UE may select a time/frequency resource for multiplexing the PUSCH (e.g., of the multi-PUSCH) with the response data (e.g., and/or other UCI). For example, the UE may determine that only one PUSCH of the multi-PUSCH overlaps PUCCH (e.g., PUSCH 3, in the example). Accordingly, the UE may select the overlapped PUSCH for multiplexing the UCI. Thus, the UE may transmit the multi-PUSCH as scheduled by the DCI and with the response data multiplexed on the selected resource.

The approach of FIG. 6 may rely on relatively simple signaling and may not allow for multiple response data transmissions to be multiplexed with a multi-PUSCH, according to some embodiments.

Figure 7:
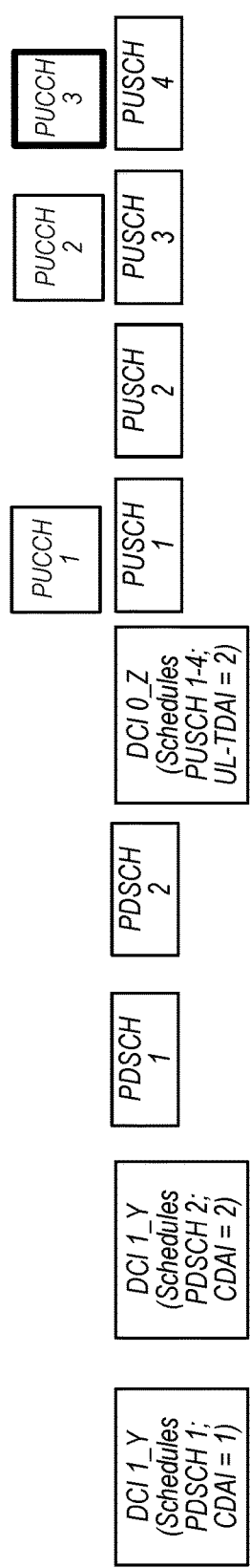

FIG. 7 illustrates another possibility in which multiple possible resources for multiplexing response data with uplink data may exist, and the UE may select a single resource, according to some embodiments. In other words, a UE may use no more than one effective PUCCH (e.g., a PUCCH selected after UCI multiplexing) overlapping at most one PUSCH within a multi-slot PUSCH. For example, the effective PUCCH may be the final PUCCH.

As shown, a first DCI (e.g., format 1_0) may schedule a first downlink transmission (e.g., PDSCH 1) and a second DCI (e.g., format 1_0) may schedule a second downlink transmission (e.g., PDSCH 2). The first and second DCIs may include CDAIs of 1 and 2, respectively (e.g., the second CDAI may count both PDSCH 1 and 2). It will be appreciated that a single DCI may schedule both PDSCH 1 and 2 and that, in that case, the single DCI may have a CDAI of 2.

The base station may transmit and the UE may (or may not) receive the downlink data (e.g., PDSCH 1 and 2).

A third DCI (e.g., format 0 Z) may schedule a series of uplink transmissions (e.g., multi-PUSCH, e.g., PUSCH 1-4 in the example). A single UL-TDAI bit field may be included, e.g., set to 2. The UL-TDAI may indicate that there two PDSCHs previously transmitted, e.g., and for which response data (e.g., HARQ ACK/NACK) has not been received by the base station.

The UE may generate response data for the respective downlink data transmissions, e.g., two respective bits may be generated based on whether the respective downlink data was successfully received.

The UE may select a time/frequency resource for multiplexing the PUSCH (e.g., of the multi-PUSCH) with the response data (e.g., and/or other UCI). For example, the UE may select a PUSCH of the multi-PUSCH which overlaps PUCCH (e.g., PUSCH 4 which overlaps PUCCH 3, in the example). The UE may use the selected PUSCH for multiplexing the UCI, e.g., the response data for the scheduled downlink data transmissions may be transmitted in the (e.g., single) selected PUSCH. Thus, the UE may transmit the multi-PUSCH as scheduled by the DCI and with the response data multiplexed on the selected resource. In other words, an effective PUCCH, e.g., PUCCH 3 that overlaps the selected PUSCH 4, may be used for transmission of the response data.

As one possibility, for the single PUSCH case, if multiple PUCCHs are scheduled across multiple slots, the UE may select an effective PUCCH (e.g., in which all the UCI on the PUCCHs are to be multiplexed) and then, if that PUCCH overlaps with a PUSCH, the UE may then multiplex the UCI and PUSCH. It will be appreciated that if no PUSCH is scheduled, the UE may send the UCI without multiplexing PUSCH.

As another possibility, for the single PUSCH case, if multiple PUCCHs are scheduled across multiple slots, the UE may select an effective PUCCH and then if it overlaps with the multi-PUSCH transmission, the UE may multiplex it on a specific PUSCH.

As one possibility, for the multiple PUSCH case, if multiple PUCCHs are scheduled across multiple slots, the UE may select multiple effective PUCCHs derived from the multi-slot PUCCHs and then multiplex these on the PUSCHs that are selected to be multiplexed on.

In some embodiments, the selected PUSCH may be the final PUSCH which overlaps PUCCH. In other words, the UE may select a time/frequency resource for multiplexing the response data with uplink data by selecting the last overlapping PUSCH of the multi-PUSCH. In some embodiments, an overlapping PUSCH/PUCCH may be selected based on different factors. For example, the UE may select a first overlapping PUSCH/PUCCH that allows the UE sufficient time for its processing delay (e.g., to generate, multiplex, and transmit the response data). As another possibility, the UE may select an overlapping PUSCH/PUCCH based on an indication from the base station, e.g., in DCI. For example, the DCI(s) scheduling the PDSCH may include respective PUCCH resource index (PRI) values, e.g., corresponding to respective downlink transmissions. The PRI values may indicate respective PUCCH opportunities for the UE to use to transmit response data for the respective downlink transmissions.

It will be appreciated that other PUCCH occasions (e.g., PUCCH 1-3) may also overlap PUSCH (e.g., PUSCH 1-4, respectively). These other PUCCH occasions may not be used (e.g., only PUSCH may be transmitted during these times, according to some embodiments. Alternatively, the UE may transmit other UCI (e.g., SR, CSI, etc.) on these other PUCCH occasions. Further, not all PUSCH may be overlapped by PUCCH (e.g., PUSCH 2).

Thus, the approach of FIG. 7 allows for increased flexibility in that multiple PUCCH opportunities may overlap PUSCH opportunities. However, the response data may be transmitted at a single opportunity, multiplexed with PUSCH.

Figure 8:
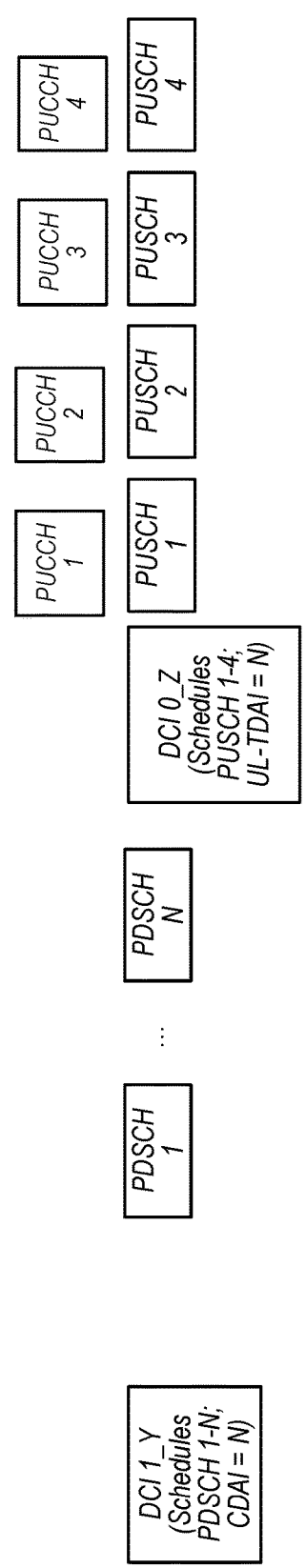

FIG. 8 illustrates an approach in which any number (e.g., potentially all) overlapping opportunities for uplink data and control transmissions may be used for multiplexing response data, according to some embodiments. For example, a UE may have all PUSCHs overlapped by effective PUCCHs within a multi-slot PUSCH. Multiple UL-TDAI bit fields may be signaled in a DCI, e.g., one for each PUSCH scheduled by the DCI. In some embodiments, a UE may not have more than one PUCCH overlapping each PUSCH per unit (e.g., per slot or per multi-slot transmission). In some embodiments, multiple PUCCHs may overlap multiple PUSCHs. In such a case, the PUCCHs may be collapsed (e.g., consolidated) to overlap respective PUSCHs. For example, if PUCCHs 1 and 2 overlap PUSCH 1 and PUCCHs 3 and 4 overlap PUSCH 2, then: PUCCHs 1 and 2 may be collapsed into a first combined PUCCH overlapping with PUSCH 1, and PUCCHs 3 and 4 may be collapsed into a second combined PUCCH overlapping with PUSCH 2. Various rules for such collapsing of PUCCHs may be adopted in a technical specification and/or established by configuration information (e.g., in 502).

As shown, a first DCI (or multiple first DCIs) (e.g., format 1_Y) may schedule a plurality of N downlink transmissions (e.g., PDSCH 1-N). The first DCI (or the last DCI of multiple first DCIs) may include a CDAI of N, e.g., corresponding to the N scheduled transmissions. The CDAI may indicate the index of the number of HARQs that have been sent up to the time of the DCI associated with the PDSCH.

In some embodiments, the first DCI(s) may include respective PRI values, e.g., corresponding to respective downlink transmissions. The PRI values may indicate respective PUCCH opportunities for the UE to use to transmit response data for the respective downlink transmissions. In other words, the PRI may indicate the resource that the HARQ ACK associated with a DCI scheduling a DL PDSCH should be transmitted on.

The base station may transmit and the UE may (or may not) receive the downlink data (e.g., PDSCH 1-N).

A further DCI (e.g., format 0_Z) may schedule a series of uplink transmissions (e.g., multi-PUSCH, e.g., PUSCH 1-4 in the example). Multiple (e.g., four, in the example) UL-TDAI bit fields may be included, e.g., respectively corresponding to the series of uplink transmissions. The UL-TDAIs (e.g., collectively) may indicate that there are N PDSCHs previously transmitted to the UE, e.g., and for which response data (e.g., HARQ ACK/NACK) has not been received by the base station. In some embodiments, the respective UL-TDAI fields may indicate respective numbers of downlink transmissions for which the UE may transmit response data multiplexed with the respective uplink transmission.

The UE may generate response data for the respective downlink data transmissions, e.g., N respective bits may be generated based on whether the respective downlink data was successfully received.

The UE may multiplex the response data with other UCI and/or uplink data and may divide the multiplexed data among the uplink resources (e.g., PUCCH/PUSCH 1-4). The UE (and the base station) may determine which particular downlink transmission(s) should have corresponding response data multiplexed with which particular uplink resource in various ways.

As one possibility, the UE may determine which portions of the response data to transmit in respective resources based on respective PRI. For example, response data associated with PRI=1 may be multiplexed for transmission with PUSCH 1, etc.

As another possibility, the UE may determine which portions of the response data to transmit in respective resources based on respective UL-TDAI. For example, response data associated with PDSCH from 1 to a first UL-TDAI value (e.g., of a first UL-TDAI field of the DCI format 0_Z) may be multiplexed for transmission with PUSCH 1, etc. In other words, the first UL-TDAI field may determine the number of downlink transmissions for which response data is multiplexed in PUSCH 1.

Figure 9:
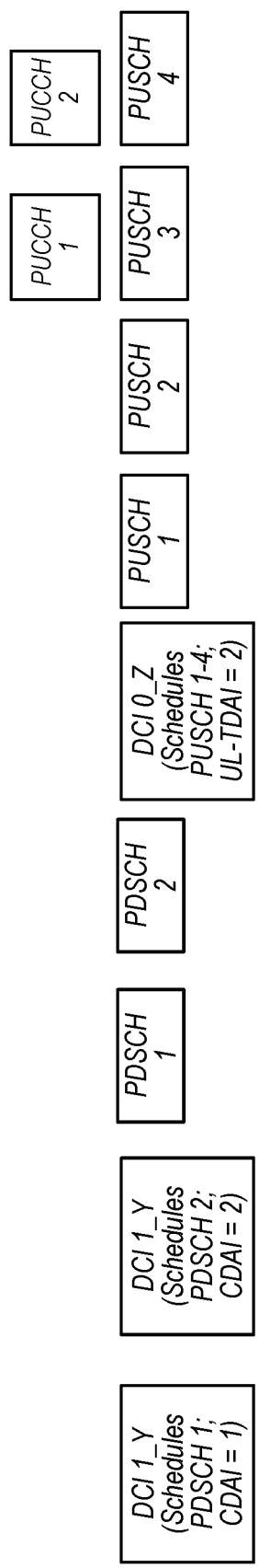

FIG. 9 illustrates an example in which a UE may have more than one uplink data transmission opportunity (e.g., X PUSCHs) overlapped by UCI transmission opportunities (e.g., effective PUCCHs) within a multi-PUSCH, according to some embodiments. The specific PUSCHs that may be multiplexed may be specified or configured by the base station. In some embodiments, a pre-defined number of UL-TDAI bit fields for the PUSCHs may be transmitted. The number (e.g., X) of PUSCHs that may be multiplexed on may be specified (e.g., by 3GPP, etc.) or configured by the base station. In some embodiments, the UE may determine a value of X based on a number of PUSCH opportunities that overlap PUCCH opportunities. A UE may not have more than one PUCCH overlapping each PUSCH per unit (e.g., per slot or per multi-slot), according to some embodiments. In the example of FIG. 9, X=2.

For example, the base station may transmit first DCI(s) scheduling a plurality (e.g., at least X) of downlink data transmissions (e.g., PDSCHs). As shown, the BS may transmit two DCIs, each scheduling one PDSCH. In some embodiments, the DCI(s) may indicate PRI values associated with the respective PDSCHs.

The base station may transmit and the UE may (or may not) receive the downlink data (e.g., PDSCH 1 and 2).

The base station may transmit a second DCI to schedule a plurality (e.g., greater than X) of uplink data transmissions (e.g., PUSCHs). The second DCI may include X UL-TDAI fields. The X UL-TDAI fields may indicate respective downlink data transmissions for the UE to include response data multiplexed with respective uplink data transmissions. For example, a first UL-TDAI field may indicate a first one or more downlink data transmissions for the UE to positively or negatively acknowledge in UCI multiplexed with a first uplink data transmission, a second UL-TDAI field may indicate a second one or more downlink data transmissions for the UE to positively or negatively acknowledge in UCI multiplexed with a second uplink data transmission, etc.

In some embodiments, the base station may change the number of PDSCH transmissions, e.g., before the last PUSCH of a multi-PUSCH transmission. For example, if a first DCI includes a first UL-TDAI, the base station may send second DCI with a second UL-TDAI.

The UE may generate response data for the respective downlink data transmissions, e.g., two respective bits may be generated based on whether the respective downlink data was successfully received.

The UE may multiplex the response data with other UCI and/or uplink data and may divide the multiplexed data among the X uplink resources available for multiplexing UCI and PUSCH (e.g., PUCCH 1 and 2, overlapping with PUSCH 3 and 4, respectively). The UE may determine which responses are multiplexed on which resources based on PRI, UL-TDAI, and or other indications from the base station (e.g., to use the first or last available opportunity, etc.), etc.

As one possibility, the UE may select the first X PUSCHs for multiplexing the response data. For example, the UE may do so based on 3GPP standards, configuration information (e.g., discussed with respect to 502), or an indication in the first or second DCI). The base station may set the schedule (e.g., in the first and/or second DCI) so that the multiplexing timeline allows sufficient time (e.g., according to a processing delay as discussed with respect to 502) for the UE to process the response data by the time of the first PUSCH, even though the first PUSCH is not necessarily overlapping with PUCCH.

As a second possibility, the UE may select the first X overlapping PUSCHs. For example, the UE may do so based on 3GPP standards, configuration information (e.g., discussed with respect to 502), or an indication in the first or second DCI). The base station may set the schedule (e.g., in the second DCI) so that the multiplexing timeline allows sufficient time (e.g., according to a processing delay as discussed with respect to 502) for the UE to process the response data by either the first PUSCH (e.g., even though response data is multiplexed at the first overlapping PUSCH) or the first symbol of a first overlapping PUSCH. In the second case (e.g., when the processing delay is complete by the first symbol of the first overlapping PUSCH), the base station may rely on the processing delay measured from respective downlink transmissions to the corresponding overlapping PUSCH. In other words, the base station may set the schedule (e.g., in the first and/or second DCI) so that the processing delay is complete by the first symbol of a respective overlapping PUSCH if measured from a latest downlink transmission for which response data is to be transmitted during the respective overlapping PUSCH. Thus, this may allow for later scheduling of downlink transmissions as the processing delay for a later downlink transmission may be complete by a later corresponding uplink transmission (e.g., but not necessarily complete by an earlier uplink transmission).

As a third possibility, the UE may select the from available opportunities (e.g., overlapping PUSCHs) based on a number of opportunities (e.g., PUSCHs to be multiplexed) and a number of total uplink opportunities (e.g., PUSCHs scheduled). For example, if M is the number of PUSCHs scheduled and X is the number of PUSCHs multiplexed, then:

if M is less than or equal to 2, then the UE may use the M-th scheduled PUSCH for multiplexing response data.

if M is greater than 2, then the UE may use opportunities later in the M opportunities. For example, the UE may use the (M−1)-th to (M−X−1)th scheduled PUSCH, e.g., resulting in X opportunities near the end of the M opportunities (e.g., except for the last, e.g., Mth opportunity) being selected.

As in the second possibility, the base station may set the schedule (e.g., in the first and/or second DCI, or the schedule may be set by specification or configured) so that the multiplexing timeline (e.g., processing delay) may be complete by the first PUSCH, although HARQ-ACK may be multiplexed on later PUSCH(s). Alternatively, as in the second possibility, the base station may set the schedule rely on the processing delay measured from respective downlink transmissions to the corresponding overlapping PUSCH.

In some embodiments, the approach of FIG. 9 may apply to multi-PDSCH cases. For example, the DCI scheduling the PDSCH may schedule multiple PDSCHs with one or more PUCCHs. In some embodiments, each PUCCH of multiple PUCCHs (e.g., scheduled by multiple respective DCIs) may be treated in the same way as a single PUCCH, e.g., as in FIG. 6. Similarly, in the case that multiple DCIs schedule multi-PDSCH transmissions corresponding to multiple PUCCHs, the multiple PUCCHs may be used, e.g., as in FIG. 9.

FIGS. 10-14—Multiplexing behavior timeline examples

Figure 10:
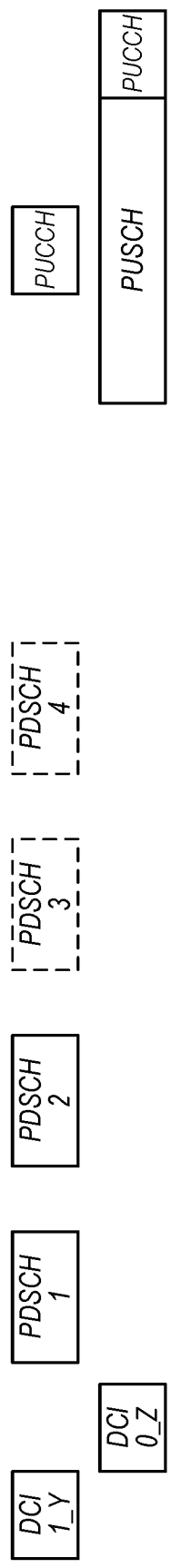
Figure 11:
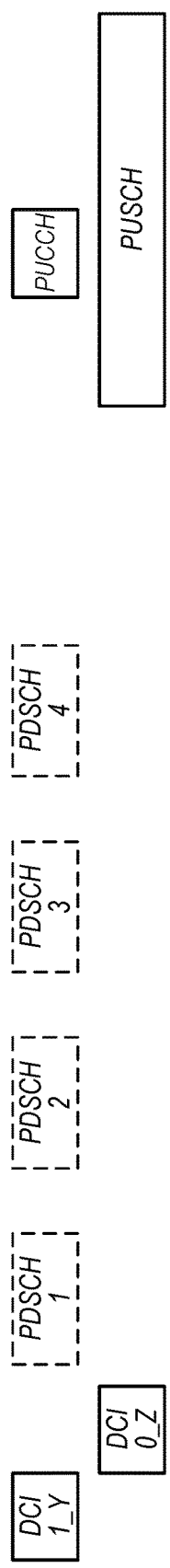

In some embodiments, the base station may not provide an indication of the number of downlink transmissions for the UE to provide response data. For example, DCI format 0_0 may not include UL-TDAI, according to some embodiments. Thus, if a DCI format used to schedule UL transmissions does not include UL-TDAI or another indication of a number of pending DL transmissions, the UE may not know the number of pending DL transmissions. For example, the UE may not be able to confirm whether a DCI scheduling one or more DL transmissions may have been missed. In such a situation, the UE may determine whether or not any DL transmissions (e.g., of a multi-PDSCH transmission, among various possibilities) has been received and, based on such a determination, the UE may or may not multiplex response data, e.g., as shown in FIGS. 10-11. For example, if a UE multiplexes HARQ-ACK information responsive to a multi-PDSCH transmission in a PUSCH transmission that is scheduled by a DCI format without a TDAI (e.g., DCI format 0_0), then, if the UE receives at least one of the PDSCHs, the UE may generate the codebook, otherwise the UE may not multiplex HARQ ACK on the PUSCH transmission.

FIG. 10 illustrates a case in which at least one DL transmission has been received and the UE multiplexes response data, according to some embodiments. As shown, a first DCI (e.g., format 1_Y) may schedule multiple PDSCH. A second DCI (e.g., format 0_Z which may not include UL-TDAI) may schedule PUSCH which overlaps with PUCCH. The UE may receive at least some PDSCH. In the example, the UE may receive PDSCH 1 and 2, but may not receive PDSCH 3 and 4). In response to determining that at least one PDSCH of the multi-PDSCH is received, the UE may generate a codebook of response data (e.g., including ACK(s) for the received DL transmissions and NACK(s) for known transmissions that are not received). The UE may multiplex the response data with PUSCH and transmit to the base station. Based on the response data, the base station may determine which, if any, PDSCH(s) were not received, and retransmit them. Note that, in the case that the codebook does not include responses (e.g., ACK or NACK) for at least some PDSCHs, the base station may determine that these PDSCHs were not received and retransmit them.

FIG. 11 illustrates a case in which no DL transmission has been received and the UE does not multiplex response data, according to some embodiments. As shown, a first DCI (e.g., format 1_Y) may schedule multiple PDSCH. A second DCI (e.g., format 0_Z, which may not include UL-TDAI) may schedule PUSCH which overlaps with PUCCH. The UE may not receive any of the PDSCH (e.g., none of PDSCH 1-4 are received successfully). In response to determining that no PDSCH of the multi-PDSCH is received, the UE may not generate a codebook of response data. In other words, the UE may not send any NACKs for PDSCH 1-4 multiplexed with the PUCCH, notwithstanding the PUCCH opportunity that overlaps the PUSCH. The UE may transmit PUSCH. In some embodiments, the UE may transmit other UCI (e.g., CSI, SR) multiplexed with the PUCCH, but may not multiplex any response data for PDSCH 1-4). In some embodiments, response data for other DL transmissions may be multiplexed. Based on the lack of response data for PDSCH 1-4, the base station may determine that all of the PDSCH(s) were not received, and may retransmit them.

Figure 12:
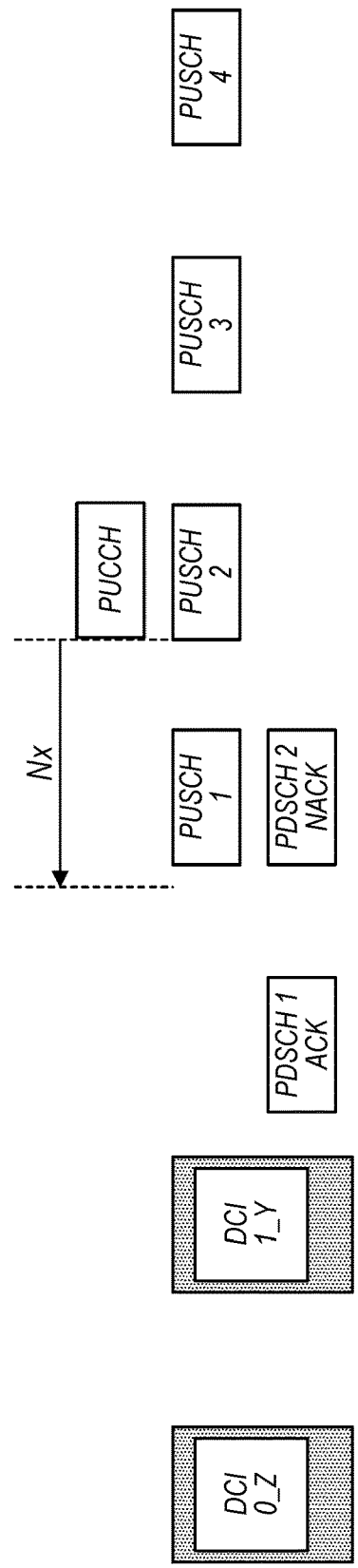
Figure 13:
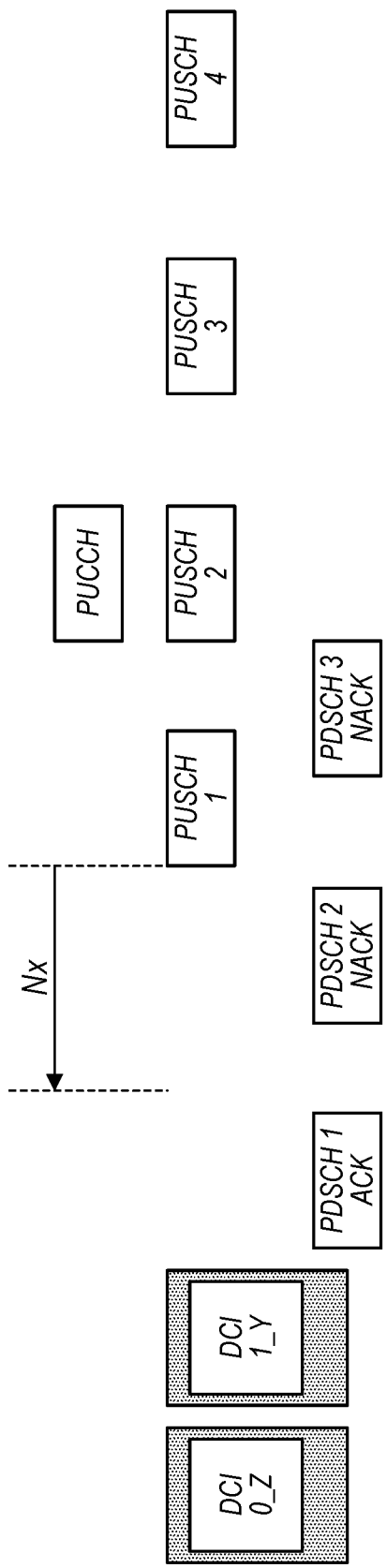
Figure 14:
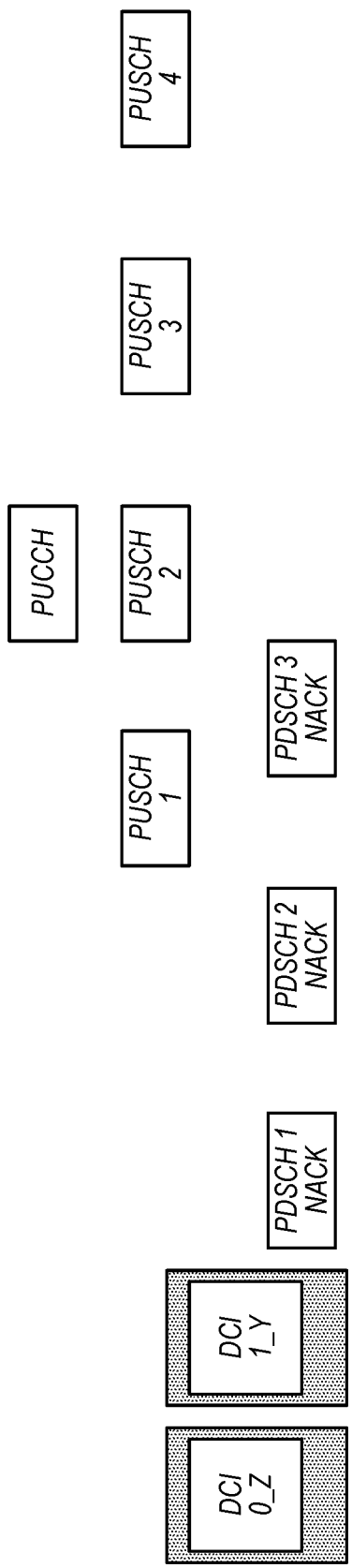

In some embodiments, a base station may schedule a PUSCH that overlaps a PUCCH prior to scheduling a PDSCH. FIGS. 12-14 illustrate examples of this situation, according to some embodiments. The UE may generate response data differently depending on relative timing of the various messages, according to some embodiments. In other words, the relative position of the monitoring occasions of DCI/PDSCH may impact the manner in which the UE generates and/or multiplexes HARQ responses.

FIG. 12 illustrates a UE setting response data as NACK for DL data transmissions that are received too close (e.g., in time) to a UCI transmission opportunity, according to some embodiments. In other words, a UE may set to NACK value in the HARQ-ACK codebook any HARQ-ACK information corresponding to PDSCH reception or SPS PDSCH release scheduled by a DCI (e.g., format 1_0 or DCI format 1_1) that the UE detects in a PDCCH monitoring occasion that is after a PDCCH monitoring occasion where the UE detects a DCI (e.g., format 0_0 or format 0_1, etc.) scheduling the PUSCH transmission and that is within a specified timeline of the PUSCH on which the HARQ-ACK will be multiplexed. Thus, negatively acknowledging a PDSCH(s) (e.g., regardless of whether or not they are successfully received), may be performed based on both the timing of the DCI and the timing of the DL transmissions.

As shown, a first DCI (e.g., format 0_1) may schedule one or more PUSCH overlapping with PUCCH. For example, PUSCH 2 may overlap PUCCH. A second DCI (e.g., format 1_1) may schedule one or more PDSCH, e.g., prior to the PUSCH overlapping PUCCH. PDSCH 1 may be transmitted sufficiently in advance of the overlapped PUSCH that the UE may positively acknowledge PDSCH 1 (e.g., if PDSCH 1 is successfully received) in the overlapped PUSCH (e.g., by multiplexing PUCCH). However, PDSCH 2 may not be transmitted sufficiently in advance of the overlapped PUSCH to allow for processing. In other words, PDSCH 2 may be transmitted within a processing delay period (e.g., illustrated as Nx) relative to the overlapped PUSCH. Thus, the UE may generate a NACK for PDSCH 2, and may multiplex the NACK for transmission with PUSCH 2. It will be appreciated that PDSCH 2 may be negatively acknowledged during PUSCH 2 regardless of whether PDSCH 2 is successfully received. The UE may determine to generate the NACK for PDSCH 2 in advance, e.g., based on scheduling information.

As discussed in 502, the processing delay timeline (e.g., NX) may include PDSCH decoding time, HARQ preparation time, and PUSCH preparation time, according to some embodiments.

FIG. 13 illustrates a UE setting response data as NACK for DL data transmissions that are received too close (e.g., in time) to an earliest UL transmission opportunity, according to some embodiments. In other words, a UE may set to NACK value in the HARQ-ACK codebook any HARQ-ACK information corresponding to PDSCH reception or SPS PDSCH release scheduled by DCI (e.g., format 1_0 or format 1_1, etc.) that the UE detects in a PDCCH monitoring occasion that is after a PDCCH monitoring occasion where the UE detects a DCI (e.g., format 0_0 or format 0_1, etc.) scheduling a multi-PUSCH transmission and that is within a processing delay period of the 1st PUSCH of the multi-PUSCH transmission on which the HARQ-ACK will be multiplexed.

As shown, a first DCI (e.g., format 0_1) may schedule one or more PUSCH overlapping with PUCCH. For example, PUSCH 2 may overlap PUCCH. A second DCI (e.g., format 1_1) may schedule one or more PDSCH, e.g., prior to the PUSCH overlapping PUCCH. PDSCH 1 may be transmitted sufficiently in advance of the first PUSCH that the UE may positively acknowledge PDSCH 1 (e.g., if PDSCH 1 is successfully received) in the overlapped PUSCH (e.g., by multiplexing PUCCH). However, PDSCH 2 may not be transmitted sufficiently in advance of the first PUSCH to allow for processing. In other words, PDSCH 2 may be transmitted within a processing delay period (e.g., illustrated as Nx) relative to the first PUSCH. Similarly, PDSCH 3 may not be transmitted prior to the first PUSCH. Thus, it may also not be sufficiently in advance (e.g., regardless of its time relative to the overlapped PUSCH). Thus, the UE may generate NACKs for PDSCH 2 and 3, and may multiplex the NACKs for transmission with PUSCH 2. It will be appreciated that PDSCH 2 and 3 may be negatively acknowledged during PUSCH 2 regardless of whether PDSCH 2 and/or 3 are successfully received. The UE may determine to generate the NACKs for PDSCH 2 and 3 in advance, e.g., based on scheduling information.

As discussed in 502, the processing delay timeline (e.g., NX) may include PDSCH decoding time, HARQ preparation time, and multi-PUSCH preparation time, according to some embodiments.

FIG. 14 illustrates a UE setting response data as NACK for DL data transmissions that are scheduled by DCI that is received after DCI scheduling the multi-PUSCH. For example, a UE may set to NACK values in the HARQ-ACK codebook for any HARQ-ACK information corresponding to PDSCH reception or SPS PDSCH release scheduled by DCI (e.g., format 1_0 or 1_1) that the UE detects in a PDCCH monitoring occasion that is after a PDCCH monitoring occasion where the UE detects a DCI (e.g., format 0_0 or 0_1, etc.) scheduling the PUSCH transmission.

As shown, a first DCI (e.g., format 0_1) may schedule one or more PUSCH overlapping with PUCCH. For example, PUSCH 2 may overlap PUCCH. A second DCI (e.g., format 1_1) may schedule one or more PDSCH, e.g., prior to the PUSCH overlapping PUCCH. Based on receiving the second DCI subsequent to the first DCI, the UE may generate NACKs for PDSCHs 1, 2, and 3, and may multiplex the NACKs for transmission with PUSCH 2. It will be appreciated that PDSCH 1-3 may be negatively acknowledged during PUSCH 2 regardless of whether PDSCH 1, 2 and/or 3 are successfully received. The UE may determine to generate the NACKs for PDSCH in advance, e.g., based on receiving the second DCI after receiving the first DCI. A processing delay may not be considered.

Figure 15:
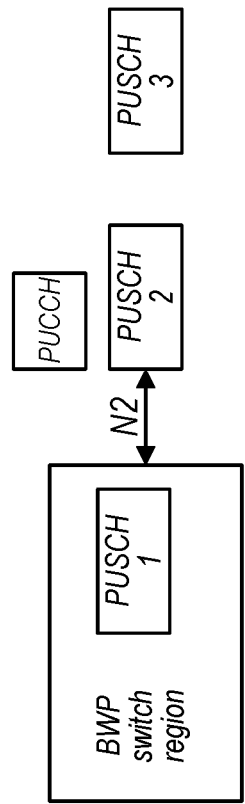
Figure 16:
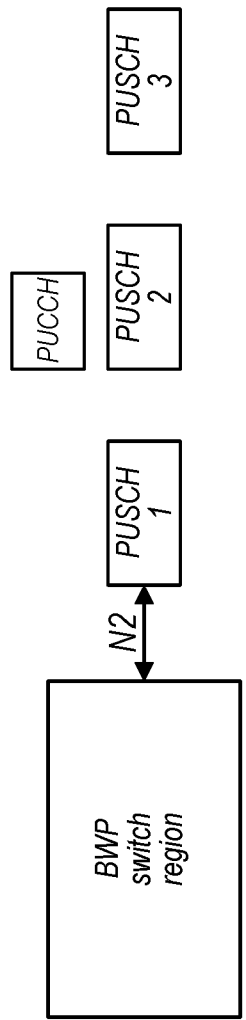

FIGS. 15-16—BWP Switching

FIGS. 15 and 16 illustrate a processing delay relative to BWP switching and UL transmissions. The techniques in these figures may apply for multiplexing on PUSCH for any DCI format.

FIG. 15 illustrates a processing delay applied relative to an overlapped PUSCH (e.g., PUSCH 2), according to some embodiments. For example, a DCI format switching a DL BWP may be transmitted at least N2 symbols prior to a first symbol of the specific PUSCH transmission where the UE multiplexes HARQ-ACK information, where N2 is the PUSCH preparation time. In other words, the base station may determine to send a DCI to switch the BWP. The base station may send the DCI at least N2 symbols prior to the overlapped PUSCH (e.g., PUSCH 2), e.g., during the illustrated BWP switch region.

FIG. 16 illustrates a processing delay applied relative to an earliest PUSCH (e.g., PUSCH 1), according to some embodiments. For example, a DCI format switching a DL BWP may be transmitted at least N2 symbols prior to a first symbol of the first PUSCH transmission of a multi-PUSCH. N2 may be the PUSCH preparation time. In other words, the base station may determine to send a DCI to switch the BWP. The base station may send the DCI at least N2 symbols prior to the first PUSCH (e.g., PUSCH 1), e.g., during the illustrated BWP switch region.

In the examples of FIGS. 15 and 16, it will be appreciated that a base station may adjust the timing of a DCI indicating a BWP switch based on the processing delay, N2. For example, a base station may transmit such a DCI early, e.g., prior to a processing delay of a previously scheduled PUSCH transmission. Alternatively, the base station may delay transmitting a BWP switch DCI, e.g., until after a multi-PUSCH transmission is complete or until after an overlapped PUSCH transmission is complete. Thus, the BWP switch DCI may not apply to a current multi-PUSCH, but may be delayed. The BWP switch DCI may be transmitted after the current multi-PUSCH. The BWP switch may thus be implemented with respect to a later transmission, but not the current multi-PUSCH. In other words, the base station may determine a latest time for transmission of the BWP switch DCI. If transmitting the BWP switch DCI prior to the latest time does not occur, the BWP switch DCI may be transmitted after the current multi-PUSCH transmission or after any overlapped PUSCH of the current multi-PUSCH transmission.

In some embodiments, the base station may be configured to refrain from transmitting any DCI indicating to change BWP subsequent to the latest time for transmission. Thus, if the base station determines to change BWP and there is not sufficient time to transmit DCI indicating the BWP change prior to the latest time for transmission, the base station may wait until the multi-PUSCH is completed.

ADDITIONAL INFORMATION AND EMBODIMENTS

It will be appreciated that the DCI formats described above and shown in various figures are examples. In some embodiments, different DCI formats may be used.

In some embodiments, if multiple PUSCHs (e.g., scheduled by a same DCI) occur in a same slot, the UE may fall back to legacy behavior. For example, the UE may to select a single PUSCH of the PUSCHs in the slot. The UE may use the selected PUSCH for multiplexing any PUCCH to be sent during the slot.

In a first set of embodiments, an apparatus, may comprise: a processor configured to cause a user equipment device (UE) to: establish communication with a base station; receive, from the base station at a first time, a first downlink control information (DCI) scheduling at least one uplink data transmission, the at least one uplink data transmission comprising an uplink data transmission multiplexed with an uplink hybrid automatic repeat request (HARQ) transmission; receive, from the base station at a second time, a second DCI scheduling at least one downlink data transmission, wherein the second time is after the first time; determine a time period for which any respective downlink data transmission of the at least one downlink data transmission received during the time period will be negatively acknowledged regardless of whether the respective downlink data transmission is received successfully, wherein the time period is relative to one of: a time of a particular uplink data transmission of the at least one uplink data transmission; or the first time; receive, from the base station during the time period, a particular downlink transmission of the at least one downlink data transmission; generate, based on receiving the particular downlink transmission of the at least one downlink data transmission during the time period, a negative acknowledgement for the particular downlink transmission of the at least one downlink data transmission; and transmit, to the base station, the uplink data transmission multiplexed with the uplink HARQ transmission, the uplink HARQ transmission including the negative acknowledgement for the particular downlink transmission of the at least one downlink data transmission.

In some embodiments, the first time and the second time comprise different monitoring occasions.

In some embodiments, the time period is relative to the time of the particular uplink data transmission; and the particular uplink data transmission of the at least one uplink data transmission is the uplink data transmission multiplexed with the uplink HARQ transmission.

In some embodiments, the time period is relative to the time of the particular uplink data transmission; and the particular uplink data transmission of the at least one uplink data transmission is an earliest uplink data transmission of the at least one uplink data transmission.

In some embodiments, the time period is relative to the first time; and the time period begins at the first time.

In some embodiments, the time period ends at a time of transmission of the uplink data transmission multiplexed with the uplink HARQ transmission.

In some embodiments, the time period is relative to the time of the particular uplink data transmission; and the time period comprises a number of symbols prior to a beginning of transmission of the particular uplink data transmission.

In a second set of embodiments, a user equipment device (UE), may comprise: a radio; and a processor operably connected to the radio and configured to cause the UE to: establish communication with a base station; receive, from the base station, one or more downlink control information (DCI) message, the one or more DCI message: scheduling a plurality of uplink data transmissions; scheduling at least one downlink data transmission; and comprising at least one downlink assignment indicator associated with the at least one downlink data transmission; determine whether a first downlink data transmission of the at least one downlink data transmission is received; generate uplink control information, the uplink control information comprising a first portion indicating whether the first downlink data transmission of the at least one downlink data transmission is received; select, based at least in part on the at least one downlink assignment indicator, a first uplink data transmission of the plurality of uplink data transmissions for multiplexing with at least the first portion of the uplink control information; and transmit, to the base station, the plurality of uplink data transmissions, wherein the first uplink data transmission is multiplexed with the at least the first portion of the uplink control information.

In some embodiments, the one or more DCI message comprises a first DCI message and a second DCI message, the first DCI message scheduling the at least one downlink data transmission and the second DCI message scheduling the plurality of uplink data transmissions and comprising the at least one downlink assignment indicator.

In some embodiments, the first uplink data transmission, multiplexed with the at least the first portion of the uplink control information, is transmitted on a physical uplink shared channel (PUSCH) at a time when the PUSCH overlaps with a physical uplink control channel (PUCCH).

In some embodiments, at least two uplink data transmissions of the plurality of uplink data transmissions overlap with opportunities to transmit the UCI, wherein a last uplink data transmission of the at least two uplink data transmissions is selected.

In some embodiments, the at least one downlink assignment indicator comprises X downlink assignment indicators; to select the first uplink data transmission comprises selecting a subset of the plurality of uplink data transmissions, the subset comprising X respective uplink data transmissions; and the X respective uplink data transmissions are respectively multiplexed with X respective portions of the uplink control information.

In some embodiments, the X respective uplink transmissions are first among the plurality of uplink data transmissions.

In some embodiments, the X respective uplink transmissions are first among a second subset of the plurality of uplink data transmissions that overlap with opportunities for transmitting uplink control information.

In some embodiments, the plurality of uplink data transmissions comprises M uplink data transmissions; X uplink data transmissions are selected for multiplexing with X respective portions of the uplink control information; and the X uplink data transmissions selected range from an (M−1)th uplink data transmission to a (M−X−1)th uplink data transmission.

In a third set of embodiments, an apparatus may comprise a processor configured to establish communication with a user equipment device (UE); transmit, to the UE, an indication to use a first bandwidth part (BWP); determine, for the UE, a first schedule of a plurality of uplink communications over a period of time, wherein the plurality of uplink communications includes an uplink control information (UCI) communication multiplexed with a second uplink communication; transmit, to the UE, first downlink control information (DCI) indicating the first schedule of the plurality of uplink communications; determine a latest time for transmission, to the UE, of a second DCI indicating to use a second BWP, wherein the latest time for transmission is relative to a time of transmission of a particular uplink communication of the plurality of uplink communications; receive, from the UE, the first uplink communication of the plurality of uplink communications; transmit, to the UE, the second DCI at or prior to the latest time for transmission; and communicate with the UE using the second BWP.

In some embodiments, the particular uplink communication of the plurality of uplink communications comprises the UCI communication multiplexed with the second uplink communication.

In some embodiments, the particular uplink communication of the plurality of uplink communications comprises an earliest uplink communication of the plurality of uplink communications.

In some embodiments, the latest time for transmission is N2 symbols prior to a first symbol of the particular uplink communication of the plurality of uplink communications.

In some embodiments, the processor is further configured to cause the base station to: at a second time: determine to use a third BWP with the UE, wherein the determination to use the third BWP with the UE occurs subsequent to a second latest time for transmission relative to a third uplink communication; and delay transmitting a DCI indicating to use the third BWP based on the second latest time for transmission so that a fourth uplink communication is scheduled to use the third BWP but the third uplink communication is scheduled to use the second BWP.

In some embodiments, the processor is further configured to refrain from transmitting any DCI indicating to change BWP subsequent to the latest time for transmission.

In some embodiments, at least one uplink communication of the plurality of uplink communications occurs prior to the particular uplink communication of the plurality of uplink communications.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
    transmitting, to a user equipment device (UE), an indication to use a first bandwidth part (BWP);
    transmitting, to the UE, a first downlink control information (DCI) indicating a first schedule of a plurality of uplink communications over a period of time, wherein the plurality of uplink communications includes an uplink control information (UCI) communication multiplexed with a second uplink communication;
    transmitting, to the UE, a second DCI indicating to use a second BWP at or prior to a latest time for transmission relative to a time of transmission of a particular uplink communication of the plurality of uplink communications; and
    communicating with the UE using the second BWP, including receiving at least one uplink communication of the plurality of uplink communications.

2. The method of claim 1, wherein the particular uplink communication of the plurality of uplink communications comprises the UCI communication multiplexed with the second uplink communication.

3. The method of claim 1, wherein the particular uplink communication of the plurality of uplink communications comprises an earliest uplink communication of the plurality of uplink communications.

4. The method of claim 1, wherein the latest time for transmission is N2 symbols prior to a first symbol of the particular uplink communication of the plurality of uplink communications.

5. The method of claim 1, further comprising:
    at a second time:
        determining to use a third BWP with the UE, wherein the determination to use the third BWP with the UE occurs subsequent to a second latest time for transmission relative to a third uplink communication; and
        delaying transmitting a third DCI indicating to use the third BWP based on the second latest time for transmission so that a fourth uplink communication is scheduled to use the third BWP but the third uplink communication is scheduled to use the second BWP.

6. The method of claim 1, wherein at least one uplink communication of the plurality of uplink communications occurs prior to the particular uplink communication of the plurality of uplink communications.

7. The method of claim 1, wherein the UCI communication comprises acknowledgement information.

8. A baseband processor configured to perform operations, the operations comprising:
    receiving, from a base station (BS), an indication to use a first bandwidth part (BWP);
    receiving, from the BS, a first downlink control information (DCI) indicating a first schedule of a plurality of uplink communications over a period of time, wherein the plurality of uplink communications includes an uplink control information (UCI) communication multiplexed with a second uplink communication;
    receiving, from the BS, a second DCI indicating to use a second BWP at or prior to a latest time for transmission relative to a time of transmission of a particular uplink communication of the plurality of uplink communications; and
    communicating with the BS using the second BWP, including transmitting at least one uplink communication of the plurality of uplink communications.

9. The baseband processor of claim 8, wherein the particular uplink communication of the plurality of uplink communications comprises the UCI communication multiplexed with the second uplink communication.

10. The baseband processor of claim 8, wherein the particular uplink communication of the plurality of uplink communications comprises an earliest uplink communication of the plurality of uplink communications.

11. The baseband processor of claim 8, wherein the latest time for transmission is N2 symbols prior to a first symbol of the particular uplink communication of the plurality of uplink communications.

12. The baseband processor of claim 8, the operations further comprising:
    receiving, from the BS, a third DCI indicating to use a third BWP based on a second latest time for transmission so that a fourth uplink communication is scheduled to use the third BWP but a third uplink communication is scheduled to use the second BWP.

13. The baseband processor of claim 8, wherein at least one uplink communication of the plurality of uplink communications occurs prior to the particular uplink communication of the plurality of uplink communications.

14. The baseband processor of claim 8, wherein the UCI communication comprises acknowledgement information.

15. A user equipment device (UE), comprising:
a radio; and
a processor communicatively coupled to the radio and configured to cause the UE to perform operations, the operations comprising:
receiving, from a base station (BS), an indication to use a first bandwidth part (BWP);
receiving, from the BS, a first downlink control information (DCI) indicating a first schedule of a plurality of uplink communications over a period of time, wherein the plurality of uplink communications includes an uplink control information (UCI) communication multiplexed with a second uplink communication;
receiving, from the BS, a second DCI indicating to use a second BWP at or prior to a latest time for transmission relative to a time of transmission of a particular uplink communication of the plurality of uplink communications; and
communicating with the BS using the second BWP, including transmitting at least one uplink communication of the plurality of uplink communications.

16. The UE of claim 15, wherein the particular uplink communication of the plurality of uplink communications comprises the UCI communication multiplexed with the second uplink communication.

17. The UE of claim 15, wherein the particular uplink communication of the plurality of uplink communications comprises an earliest uplink communication of the plurality of uplink communications.

18. The UE of claim 15, wherein the latest time for transmission is N2 symbols prior to a first symbol of the particular uplink communication of the plurality of uplink communications.

19. The UE of claim 15, the operations further comprising:
receiving, from the BS, a third DCI indicating to use a third BWP based on a second latest time for transmission so that a fourth uplink communication is scheduled to use the third BWP but a third uplink communication is scheduled to use the second BWP.

20. The UE of claim 15, wherein at least one uplink communication of the plurality of uplink communications occurs prior to the particular uplink communication of the plurality of uplink communications.

* * * * *